United States Patent
Guillemaut et al.

(10) Patent No.: US 9,656,736 B2
(45) Date of Patent: May 23, 2017

(54) METHOD FOR ASSEMBLING AN AIRCRAFT AFT PORTION

(71) Applicants: Airbus Operations (S.A.S.), Toulouse (FR); Airbus Operations, S.L., Madrid (ES)

(72) Inventors: Julien Guillemaut, Toulouse (FR); Esteban Martino Gonzalez, Aranjuez (ES); Diego Folch Cortes, Getafe (ES); Jerome Colmagro, Toulouse (FR); Jonathan Blanc, Blagnac (FR)

(73) Assignees: Airbus Operations (S.A.S.), Toulouse (FR); Airbus Operations SL, Getafe (ES)

( * ) Notice: Subject to any disclaimer, the term of this patent is extended or adjusted under 35 U.S.C. 154(b) by 132 days.

(21) Appl. No.: 14/695,731

(22) Filed: Apr. 24, 2015

(65) Prior Publication Data

US 2016/0311515 A1  Oct. 27, 2016

(30) Foreign Application Priority Data

Apr. 28, 2014  (FR) ...................................... 14 53807

(51) Int. Cl.
*B64C 1/06*   (2006.01)
*B64C 1/26*   (2006.01)

(52) U.S. Cl.
CPC ............... *B64C 1/061* (2013.01); *B64C 1/26* (2013.01)

(58) Field of Classification Search
CPC .......... B64F 5/0009; B64C 1/068; B64C 1/26
See application file for complete search history.

(56) References Cited

U.S. PATENT DOCUMENTS

| 4,821,980 A | * | 4/1989 | Clausen | B64D 27/26 244/54 |
| 6,237,210 B1 | * | 5/2001 | Stoewer | B64C 1/00 29/243.53 |
| 8,157,210 B2 | * | 4/2012 | Huber | B64C 1/061 244/118.1 |

(Continued)

FOREIGN PATENT DOCUMENTS

| FR | WO2010031959 | * | 3/2010 | ............... B64C 1/16 |
| FR | 2 939 101 | | 6/2010 | |

(Continued)

OTHER PUBLICATIONS

French Search Report for Application No. 14 53 807 dated Dec. 15, 2014.

*Primary Examiner* — Justin Benedik
(74) *Attorney, Agent, or Firm* — Jenkins, Wilson, Taylor & Hunt, P.A.

(57) ABSTRACT

In the case of an aircraft aft portion equipped with an engine mounting structure passing across the fuselage, assembly of the aft portion presents problems caused by the moving of the box structure of the mounting structure through lateral openings in the fuselage. In order to overcome these problems, a method of assembling an aircraft aft portion is proposed, in which method the box structure of the engine mounting structure is inserted into the fuselage through a top opening extending from one side of the fuselage to the other across a vertical midplane of the fuselage such that the top opening opens to the top and to the sides of the fuselage.

16 Claims, 4 Drawing Sheets

(56) References Cited

U.S. PATENT DOCUMENTS

| | | | | |
|---|---|---|---|---|
| 8,336,811 B2* | 12/2012 | Cazals | ..................... | B64C 1/26 244/2 |
| 8,490,286 B2* | 7/2013 | Meyer | ..................... | B64C 1/068 29/897 |
| 8,540,186 B2* | 9/2013 | Marche | ................. | B64D 27/14 244/54 |
| 8,651,414 B2* | 2/2014 | Cazals | ................... | B64C 1/068 244/13 |
| 8,960,603 B2* | 2/2015 | Santolalla | ............... | B64C 1/061 244/119 |
| 2001/0054228 A1* | 12/2001 | Lehmker | ................. | B21J 15/10 29/701 |
| 2006/0185143 A1* | 8/2006 | Frauen | ................. | B23P 21/004 29/33 K |
| 2009/0140096 A1* | 6/2009 | Verde Preckler | ....... | B64C 1/068 244/55 |
| 2009/0283509 A1* | 11/2009 | Frauen | ................. | B23K 20/122 219/121.85 |
| 2010/0133382 A1* | 6/2010 | Pahl | ......................... | B64C 3/22 244/120 |
| 2010/0192376 A1* | 8/2010 | Frauen | ................. | B64F 5/0009 29/897.2 |
| 2011/0138603 A1* | 6/2011 | Blees | ....................... | B64F 5/00 29/429 |
| 2012/0186062 A1* | 7/2012 | Vera Villares | .......... | B64C 1/069 29/428 |
| 2013/0277901 A1* | 10/2013 | Moje | ....................... | B64C 1/06 269/1 |

FOREIGN PATENT DOCUMENTS

| | | |
|---|---|---|
| WO | WO 2010/031959 | 3/2010 |
| WO | WO 2011/086221 | 7/2011 |

* cited by examiner

METHOD FOR ASSEMBLING AN AIRCRAFT AFT PORTION

CROSS-REFERENCE TO RELATED APPLICATION

This application claims priority to FR 14 53807 filed Apr. 28, 2014, the entire disclosure of which is incorporated by reference herein.

TECHNICAL FIELD

The present disclosure relates to the assembling of an aircraft aft portion equipped with engines attached to its fuselage.

BACKGROUND

In order to create an aircraft aft portion such as this, the prior art has proposed interposing an attachment pylon between the fuselage and each engine, as described for example in International application WO 2011/086221. In this configuration, the pylon is fixed directly to the fuselage. In order satisfactorily to transfer engine load to the fuselage, substantial structural reinforcers prove necessary for this pylon, and for the part of the fuselage that supports it, and for the attachment structure interposed between these elements. That results in a significant mass penalty.

Another solution is to provide an engine mounting structure passing across the fuselage, and across the interior space of the aircraft defined by this fuselage, as in International application WO 2010/031959 for example.

This solution makes it possible to reduce the intensity of the load introduced into the fuselage at each of the two openings therein through which the mounting structure passes, particularly load directed in the main direction of the mounting structure, namely in a plane orthogonal to a longitudinal direction of the aircraft.

However, assembling the engine mounting structure with the fuselage requires that the two half-structures of which the mounting structure is formed be moved one towards the other through openings in the fuselage.

Such an operation presents risks of damaging the fuselage and the engine mounting structure, and proves to be difficult to carry out and costly in terms of time.

SUMMARY

It is an object of the disclosure herein to provide a simple, economical and effective solution to this problem.

To this end, the disclosure herein proposes a method for assembling an aircraft aft portion, comprising:
  on the one hand, assembling a fuselage outer skin and circumferential frames so as to form a fuselage of the aircraft aft portion having a top opening extending from one side of the fuselage to the other across a vertical midplane of the fuselage so that the top opening opens towards the top and towards the sides of the fuselage, and, on the other hand, assembling a mounting structure comprising a box structure and having opposite ends which are provided with attachment structure intended for attaching aircraft engines to the mounting structure, then
  inserting the box structure of the mounting structure into the top opening of the fuselage, then
  fixing the box structure of the mounting structure to the fuselage.

The "top" and the "sides" are naturally defined with reference to an orientation adopted by the aircraft aft portion when it is fitted to an aircraft parked on a horizontal surface. This orientation is preferably also the orientation adopted by the fuselage of the aircraft aft portion during the method of assembly thereof.

Inserting the box structure of the mounting structure into an opening in the fuselage that opens towards the top and towards the sides of the fuselage makes the operation of mounting the mounting structure on the fuselage easier and makes it possible to reduce the risks of damage to these elements, which risks are encountered when using the methods of assembly of the prior art that comprise inserting and moving the box structure through lateral openings in the fuselage.

The method according to the disclosure herein also offers the option of assembling aerodynamic fairings on the lateral portions of the box structure before the mounting structure is mounted on the fuselage.

Similarly, the method according to the disclosure herein also makes it possible for aircraft engines to be mounted on the mounting structure before this mounting structure is mounted on the fuselage.

Preferably, the fuselage comprises two circumferential frames, these respectively being the forward frame and an aft frame, which extend forward of and aft of the top opening in the fuselage.

Preferably, the method comprises a later step of connecting the forward and aft circumferential frames by at least one top cross beam extending above the middle portion of the box structure of the mounting structure.

Preferably, one of the at least one top cross beams, hereinafter referred to as the central top cross beam, is centered in the vertical midplane of the aircraft aft portion, the method comprising fixing the central top cross beam to the box structure of the mounting structure.

Preferably, the forward and aft circumferential frames are joined together by two lateral cross beams extending respectively one on each side of the fuselage, below the top opening in the fuselage.

Preferably, the method involves, before inserting the box structure of the mounting structure into the top opening in the fuselage, a step of assembling a top fairing with the middle portion of the box structure of the mounting structure so that the top fairing aerodynamically closes off a middle section of the top opening in the fuselage after the middle portion of the box structure has been fixed to the fuselage.

Preferably, the top fairing is secured beforehand to a top aileron, the top aileron being positioned such that when the top fairing is assembled with the fuselage, the top aileron extends above the top fairing and in the forward continuation of an empennage of the aircraft aft portion.

As an alternative, the method involves, after fixing the middle portion of the box section to the fuselage, a later step of mounting a top fairing on the fuselage, over the top of the middle portion of the box structure of the mounting structure, so that the top fairing aerodynamically closes off a middle section of the top opening in the fuselage.

Preferably, the method involves a later step of mounting a top aileron on the top fairing in the forward continuation of an empennage of the aircraft aft portion.

Preferably, the top fairing incorporates longitudinal stiffeners so that in normal operation, the top fairing participates in the transfer of load between a portion of the fuselage that is situated aft of the top opening in the fuselage and a portion of the fuselage that is situated forward of the top opening in the fuselage.

In another alternative form, the middle portion of the box structure of the mounting structure comprises an aerodynamic top skin delimiting the box structure and shaped so as to extend in the continuation of the outer skin of the fuselage after the middle portion of the box structure has been inserted into the top opening in the fuselage.

In general, the method preferably involves a moving of the mounting structure in a vertical direction culminating in the insertion of the box structure of the mounting structure in the top opening in the fuselage.

Moreover, the method preferably involves a step of fixing aircraft engines to the mounting structure, this step taking place before the box structure of the mounting structure is inserted into the top opening in the fuselage.

The disclosure herein also relates to an aircraft aft portion comprising a fuselage formed of a fuselage outer skin and of circumferential frames, and a mounting structure comprising a box structure and attachment structure intended for the attaching of aircraft engines to the mounting structure.

According to the disclosure herein, the fuselage has a top opening extending from one side of the fuselage to the other across a vertical midplane of the fuselage so that the top opening opens towards the top and towards the sides of the fuselage. In addition, the box structure comprises a middle portion housed in the top opening in the fuselage and fixed to the fuselage.

Preferably, the box structure comprises a top skin forming part of an outer fairing of the aircraft aft portion.

BRIEF DESCRIPTION OF THE DRAWINGS

The disclosure herein will be better understood and further details, advantages and features thereof will become apparent from reading the following description given by way of nonlimiting example and with reference to the attached drawings in which.

Throughout all of these figures, identical references may denote elements that are identical or analogous.

DETAILED DESCRIPTION

Figure 1:
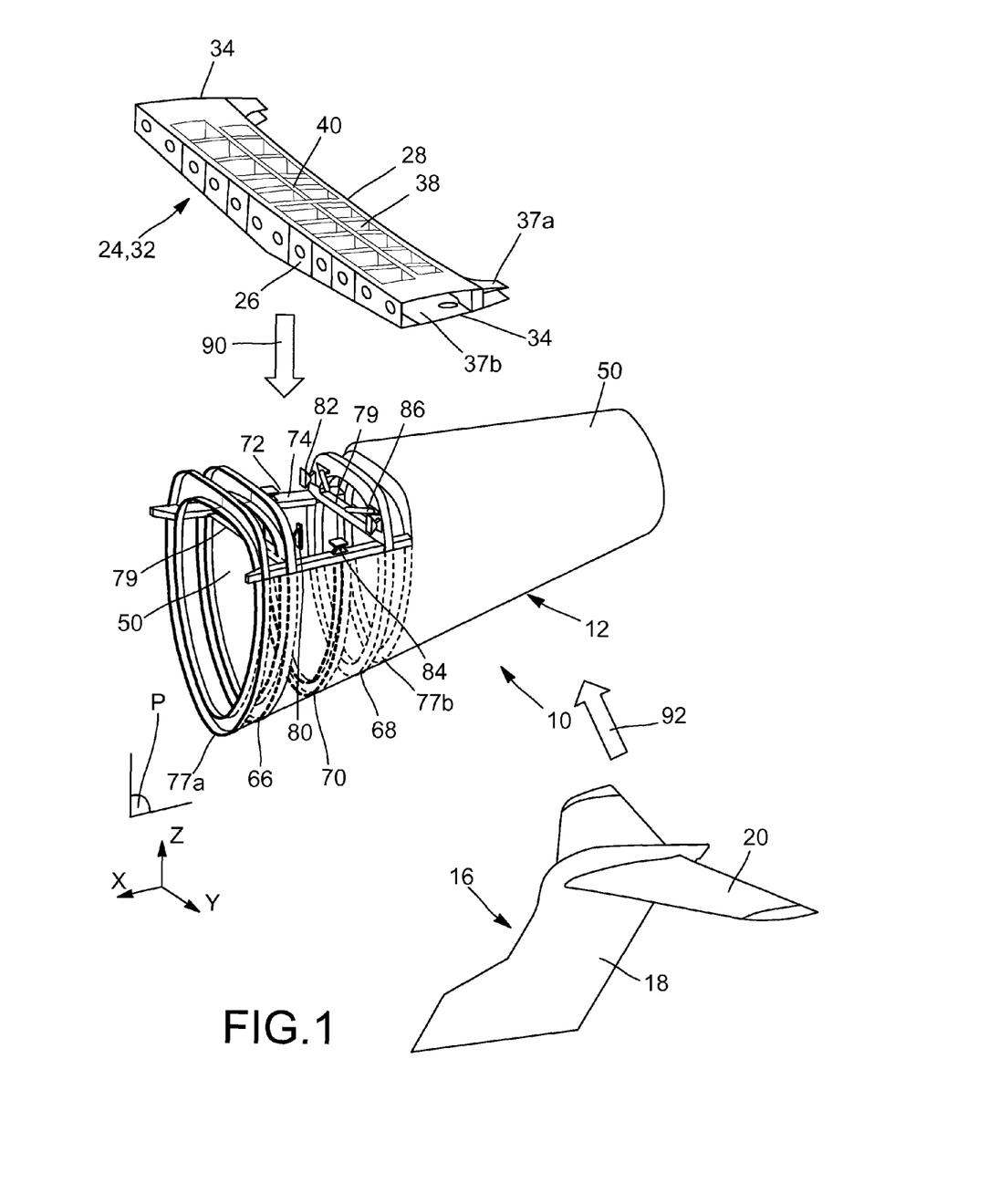
FIG. 1 illustrates two steps of a method of assembling an aircraft aft portion according to a first preferred embodiment of the disclosure herein.

FIG. 1 illustrates a first step in a method of assembling an aircraft aft portion 10 according to a first preferred embodiment of the disclosure herein, from a fuselage 12 intended to delimit an interior space of the aircraft, a rear empennage 16 provided with a rudder 18 and an elevator 20, two engines (not depicted) which are for example unducted turbojet engines with contrarotating propellers, of the type commonly referred to as "open rotor" engines and a mounting structure 24 for mounting the engines. The engines may of course be turboprop engines or alternatively ducted-fan turbojet engines, without departing from the scope of the disclosure herein.

In the description that follows, the longitudinal direction of the aircraft is referred to as X, the vertical direction as Z, and the transverse direction, which is orthogonal to the previous two directions, as Y. These directions are defined with reference to an orientation adopted by the aircraft aft portion when it is fitted to an aircraft parked on a horizontal surface, which also preferably corresponds to an orientation of the fuselage 12 of the aircraft aft portion 10 during the method of assembling the latter.

The mounting structure 24 comprises a forward spar 26 and an aft spar 28 joined together by a plurality of ribs extending substantially orthogonal to the spars so as to form a box structure 32.

The box structure 32 has opposite lateral ends 34 which are provided with attachment structure (not depicted) intended for attaching the engines.

The box structure 32 is strengthened and closed by a top skin 37a and a bottom skin 37b which are fixed respectively to the top edge and to the bottom edge of the spars 26, 28 and ribs of the box structure 32.

In general, the spars 26, 28 of the box structure 32 are preferably each produced as a single piece, or as an alternative may each be formed of several beams joined end to end, for example using bolts or fishplates. Similarly, the top 37a and bottom 37b skins may each be produced as a single piece or as parts joined together.

The box structure 32 is broken down into a middle portion 38 intended to be housed inside the fuselage 12, and into two lateral parts 40 intended to extend outside of the fuselage 12 and ending respectively in the lateral ends 34.

The fuselage 12 in general comprises an outer skin 50, which may be reinforced by internal longitudinal stiffeners (the latter not being visible in FIG. 1), and circumferential frames supporting the outer skin 50. FIG. 1 shows five of these circumferential frames, particularly a forward circumferential frame 66 and an aft circumferential frame 68, as well as an intermediate circumferential frame 70. The front 66 and aft 68 circumferential frames define forward and aft ends of a top opening 72 in the fuselage 12 which opening is intended to house the box structure 32 of the mounting structure 24, whereas the intermediate circumferential frame 70 extends between the forward 66 and aft 68 circumferential frames and is truncated, namely devoid of its top section, so that the intermediate circumferential frame 70 extends wholly below the top opening 72.

The forward 66 and aft 68 circumferential frames are joined together by two fuselage lateral cross beams 74 extending respectively one on each side of the fuselage 12, below the top opening 72 of the fuselage. The lateral cross beams extend symmetrically with respect to a vertical midplane P of the aircraft aft portion 10. These lateral cross beams each extend at least as far as the circumferential frame 77a that is next after the forward circumferential frame 66 in the forward direction, and as far as the circumferential frame 77b that is next after the aft circumferential frame 68 in the aft direction. The intermediate circumferential frame 70 is truncated by the two lateral fuselage cross beams 74 and thus has two opposite circumferential ends connected respectively to the two lateral fuselage cross beams 74.

Each of the forward 66 and aft 68 circumferential frames further comprises a strengthening cross beam 79 extending in the transverse direction Y, substantially at the same vertical height as the lateral cross beams 74.

The fuselage 12 comprises two forward mounts 80, two aft mounts 82, two intermediate mounts 84, and four load-reacting link rods 86, which are intended for fixing the mounting structure 24 to the fuselage 12. All of these mounts and link rods are arranged symmetrically on each side of the vertical midplane P.

The forward 80, aft 82, and intermediate 84 mounts adopt for example the form of clevis mounts articulated about respective axes substantially parallel to the transverse direction Y so as to allow load to be transmitted in the longitudinal direction X and vertical direction Z.

The forward mounts 80 are configured to connect the forward spar 26 of the box structure 32 to the forward circumferential frame 66, whereas the aft mounts 82 are configured to connect the aft spar 28 of the box structure 32 to the aft circumferential frame 68. In the example illustrated, the forward 80 and aft 82 mounts are configured to extend respectively in front of and behind the box structure 32.

Figure 2:
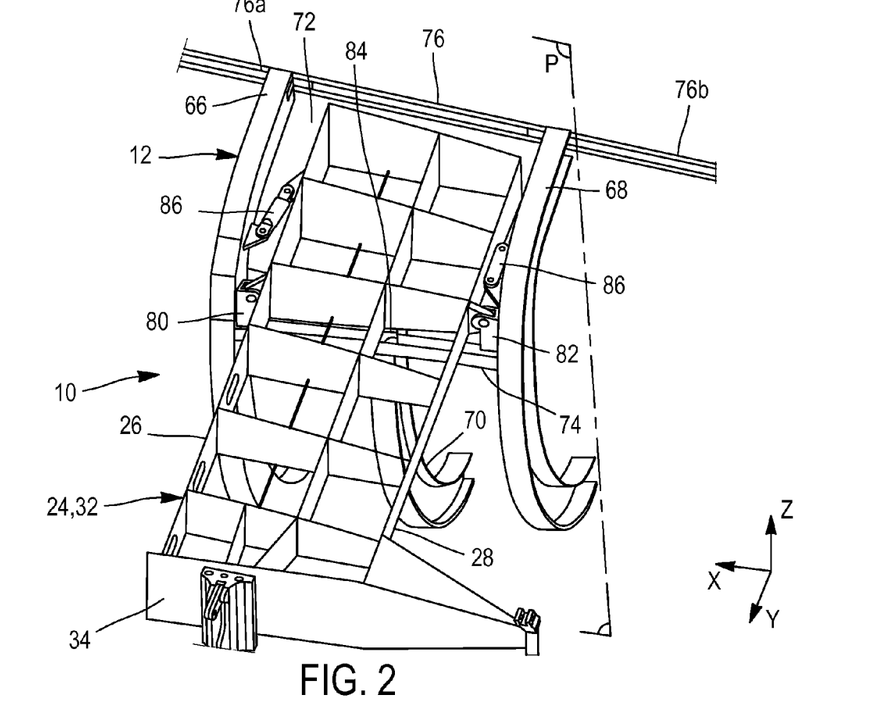
FIG. 2 illustrates the aircraft aft portion at the end of a later step of the method according to the first preferred embodiment of the disclosure herein.

Moreover, the load-reacting link rods 86 split into two forward link rods and two aft link rods (one link rod of each type being visible in FIG. 2, as will become more clearly apparent in what follows). Each forward link rod has one end intended to be connected to a clevis secured to the forward spar 26 and an opposite end intended to be connected to a clevis secured to the forward circumferential frame 66. Similarly, each aft link rod has one end intended to be connected to a clevis secured to the aft spar 28 and an opposite end intended to be connected to a clevis secured to the aft circumferential frame 68. These load-reacting link rods 86 extend substantially in the transverse direction Y so as mainly to transmit load oriented in this transverse direction Y.

The method of assembling the fuselage aft portion 10 first of all comprises assembling elements that make up the fuselage 12, notably the circumferential frames 66, 68, 70, 77a, 77b, the outer skin 50, the lateral cross beams 74 and the mounts 80, 82, 84 and load-reacting link rods 86, so as to obtain the fuselage as depicted in part in FIG. 1, with its top opening 72 extending from one side of the fuselage 12 to the other across the vertical midplane P of the fuselage. The top opening 72 thus opens towards the top and towards the sides of the fuselage.

Moreover, the method comprises assembling the elements that make up the box structure 32 of the engine mounting structure 24, notably the spars 26 and 28, the ribs, the skins 37a and 37b and, as appropriate, the engine attachment structure and the engines. For the sake of clarity, the engines and the structure for attaching these engines have not been depicted in FIG. 1.

Assembly of the engine mounting structure 24 may be performed prior to assembly of the fuselage 12, or after assembly of the fuselage, or alternatively, in parallel therewith.

Next, the method comprises inserting the box structure 32 of the mounting structure 24 into the top opening 72 in the fuselage, as symbolized by the arrow 90 in FIG. 1, followed by attachment of the box structure 32 of the mounting structure 24 to the fuselage, for example using the mounts 80, 82, 84 and the load-reacting link rods 86 all described hereinabove.

In parallel with these operations of inserting and attaching the box structure 32 of the mounting structure, or alternatively before or after these operations, the empennage 16 is also mounted on the fuselage 12 as illustrated by the arrow 92 in FIG. 1.

In the first embodiment of the disclosure herein, the method next comprises attaching one or more upper cross beams 76 to the forward 66 and aft 68 circumferential frames so that each upper cross beam connects these two circumferential frames together, as shown by FIG. 2.

In the example illustrated in FIG. 2, a single upper cross beam 76 is depicted and this is centred with respect to the vertical midplane P. This upper cross beam is referred to as the "central upper cross beam" in what follows. In addition, the central upper cross beam 76 extends in the axial continuation of two upper longitudinal beams 76a and 76b of the fuselage 12 which are respectively arranged forward of and aft of the central upper cross beam 76 and also extend in the vertical midplane P.

In the example illustrated in FIG. 2, the central upper cross beam 76 extends some distance from the box structure 32 of the mounting structure 24.

In general, each upper cross beam 76 is able to transmit some of the load, notably load oriented in the longitudinal direction X, from the part of the fuselage 12 that is situated aft of the opening 72 to the part of the fuselage 12 that is situated forward of the opening 72.

Figure 3:
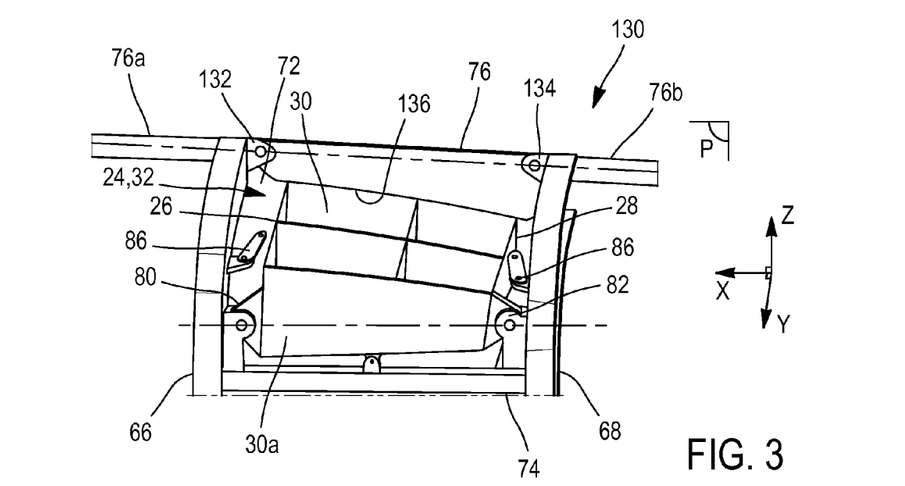
FIG. 3 illustrates the aircraft aft portion at the end of an alternative form of embodiment of the step of FIG. 2.

FIG. 3 illustrates an alternative form of embodiment of the method, in which the method further comprises fixing the central upper cross beam 76 to the box structure 32 of the mounting structure 24.

To do that, the central upper cross beam 76 adopts for example the form of a panel or of a beam extending in the vertical midplane P, and having a forward end connected to a clevis 132 secured to the forward circumferential frame 66 so as to form a pivot-type connection or ball joint able to react longitudinal and vertical load, a rear end connected to a clevis 134 secured to the aft circumferential frame 68 so as likewise to form a pivot type connection or ball joint able to react longitudinal and vertical load, and a lower edge 136 secured to a rib 30 of the box structure 32. For that purpose, the lower edge 136 may be fixed to the rib of the box structure by fishplating, or the central upper cross beam 76 may be produced as one piece with the rib.

Some of the longitudinal and vertical load imparted by the mounting structure 24 to the fuselage 12 can thus pass directly via the central upper cross beam 76.

In the example illustrated, the central upper cross beam 76 is secured to the box structure 32 of the mounting structure 24 before the latter is assembled with the fuselage 12. Thus, the method of assembling the mounting structure 24 with the fuselage 12 comprises attaching the central upper cross beam 76 to the circumferential frames 66 and 68.

Figure 4:
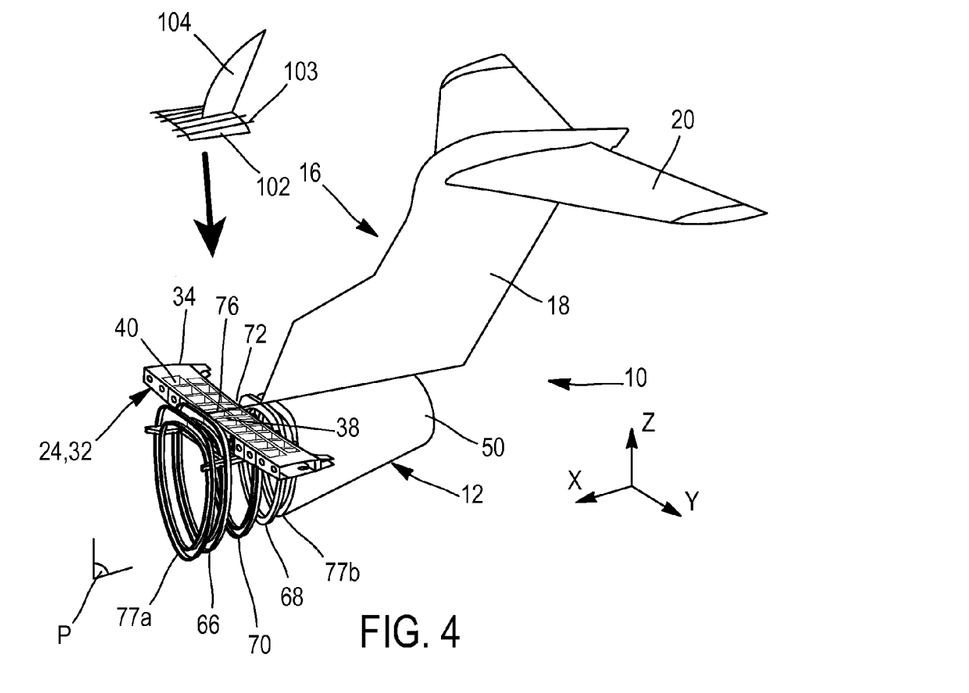
FIG. 4 illustrates a later step in the method according to the first preferred embodiment of the disclosure herein.

FIG. 4 illustrates a later step in the method according to the first embodiment of the disclosure herein, comprising mounting a top fairing 102 on the fuselage 12, above the middle portion 38 of the mounting structure 24 so as to close off a middle section of the top opening 72 in the fuselage and thus ensure the aerodynamic continuity of the outer skin 50 of the fuselage.

The top fairing 102 is, for example, fixed to the forward 66 and aft 68 circumferential frames and to the top cross beam 76, for example using fixings with countersunk heads.

In the example illustrated, the top fairing 102 incorporates four longitudinal stiffeners 103 distributed symmetrically on each side of a midplane of the fairing. The mounting of the top fairing 102 therefore also comprises fixing the longitudinal stiffeners 103 to the forward 66 and rear 68 circumferential frames, for example using fixings with countersunk heads. The circumferential frames comprise notches open radially to the outside to accept the longitudinal stiffeners 103.

Aside from its aerodynamic function, the top fairing 102 can thus perform a structural role, namely participate in the transfer of load, notably longitudinal load, between a part of the fuselage situated aft of the top opening 72 of the fuselage, notably the aft circumferential frame 68, and a part of the fuselage situated forward of the top opening 72 in the fuselage, notably the forward circumferential frame 66.

In addition, the top fairing 102 may participate in protecting each of the engines in the event of an incident that causes a blade or vane, or a fragment thereof, torn out of the opposite engine, to be thrown out. Specifically, the top fairing 102 lies in the potential paths connecting the respective rotors of the engines with one another.

Figure 5:
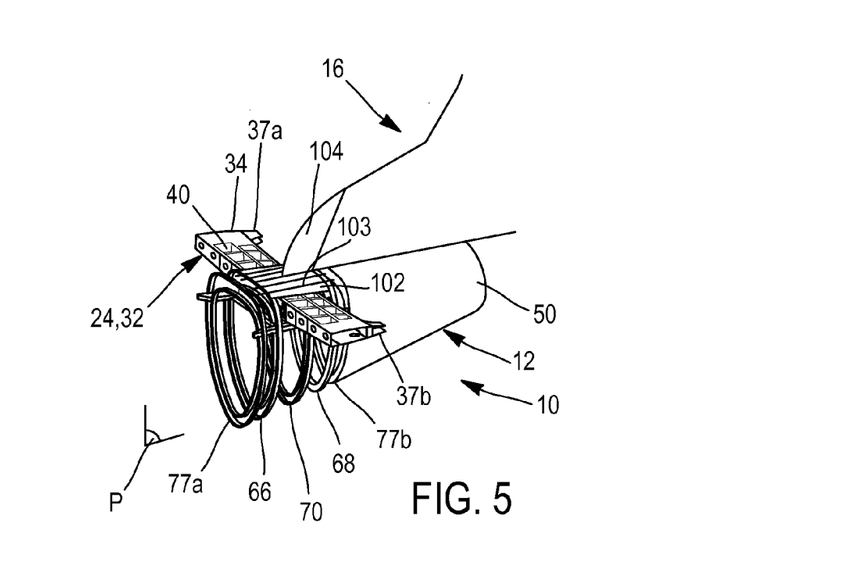
FIG. 5 illustrates the aircraft aft portion at the end of the method step illustrated in FIG. 4.

In addition, in the example illustrated, the top fairing 102 is secured beforehand to an upper aileron 104, also referred to as a "dorsal fin", positioned in such a way as to extend above the fuselage top fairing 102 when the latter is mounted on the fuselage 12, as shown by FIG. 5. The top aileron 104 thus extends in the forward continuation of the empennage 16, and thus forms a bottom part of a leading edge of the empennage 16.

As an alternative, the top aileron 104 may be assembled with the top fairing 102 after the latter has been assembled with the fuselage 12.

The top aileron 104 is designed to participate in protecting each of the engines in the event of an incident causing a blade or vane, or a fragment thereof, torn from the opposite engine, to be thrown out.

The method furthermore comprises a step (not illustrated in the figures) comprising mounting aerodynamic fairings on the front and rear of the lateral parts 40 of the mounting structure 24 so that these aerodynamic fairings are connected to the fuselage 12 and form respective leading edges and respective trailing edges of the two lateral parts 40 of the mounting structure. These aerodynamic fairings may be assembled with the mounting structure 24 beforehand before the latter is joined to the fuselage 12. As an alternative, these aerodynamic fairings may be installed on the mounting structure 24 after the latter has been assembled with the fuselage 12.

Furthermore, if an upper cross beam 76 is preassembled with the box structure 32 of the mounting structure 24, as described hereinabove with reference to FIG. 3, the top fairing 102 may be fixed beforehand to the upper cross beam 76 before the box structure 32 of the mounting structure is inserted into the top opening 72 in the fuselage. The upper cross beam 76 thus provides mechanical support for the top fairing 102 before the top fairing 102 is assembled with the fuselage.

Figure 6:
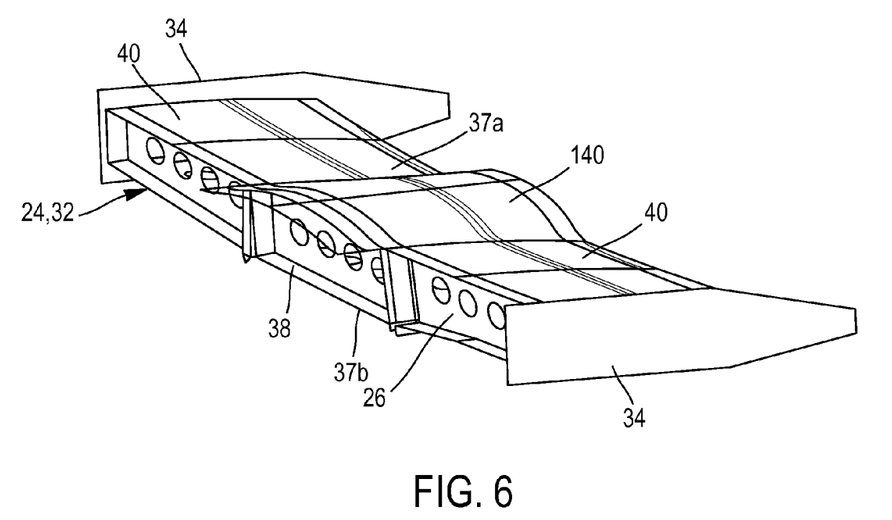
FIG. 6 is a schematic perspective view of an engine mounting structure intended to be used for implementing a method of assembling an aircraft aft portion according to a second preferred embodiment of the disclosure herein.

FIG. 6 illustrates an engine mounting structure 24 intended to be used for implementing a method of assembling an aircraft aft portion according to a second preferred embodiment of the disclosure herein.

Figure 7:
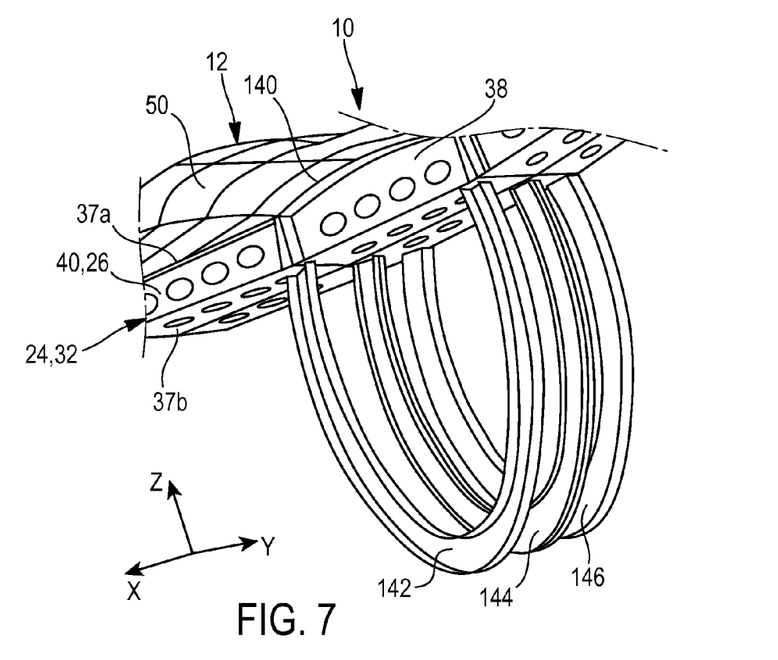
FIG. 7 is a schematic partial perspective view of an aircraft aft portion obtained by the method according to the second preferred embodiment of the disclosure herein.

This mounting structure 24 differs from the mounting structure of FIGS. 1 to 5 in that the middle portion 38 of the box structure 32 is covered with an aerodynamic top skin 140 forming part of the top skin 37a of the box structure 32 and configured to extend in the continuation of the outer skin 50 of the fuselage 12 when the box structure 32 of the mounting structure 24 is fixed to the fuselage 12, as illustrated by FIG. 7 which shows the aircraft aft portion 10 equipped with this mounting structure 24.

In the example described, the box structure 32 of the mounting structure 24 is fixed to the opposite top ends of three truncated consecutive circumferential frames respectively referred to as the forward circumferential frame 142, intermediate circumferential frame 144 and aft circumferential frame 146.

The middle portion 38 of the box structure 32 thus joins together the upper ends of each of the circumferential frames 142, 144 and 146.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling an aircraft aft portion, the method comprising:
   assembling a fuselage outer skin and circumferential frames to form a fuselage of the aircraft aft portion, the fuselage having a top opening extending from one side of the fuselage to another side thereof across a vertical midplane of the fuselage, so that the top opening opens towards a top and towards sides of the fuselage;
   assembling a box structure of a mounting structure provided with an attachment structure configured to attach aircraft engines to the mounting structure;
   inserting a middle portion of the box structure of the mounting structure into the top opening of the fuselage; and
   fixing the middle portion of the box structure to the fuselage.

2. The method according to claim 1, wherein the fuselage comprises a forward frame extending forward of the top opening in the fuselage and an aft frame extending aft of the top opening in the fuselage.

3. The method according to claim 2, comprising connecting the forward frame and the aft circumferential frame by at least one top cross beam extending above the middle portion of the box structure of the mounting structure.

4. The method according to claim 3, wherein a central top cross beam of the at least one top cross beam is centered in the vertical midplane of the aircraft aft portion, the method comprising fixing the central top cross beam to the box structure of the mounting structure.

5. The method according to claim 2, wherein the forward frame and the aft circumferential frame are joined together by two lateral cross beams extending respectively on each side of the fuselage, below the top opening in the fuselage.

6. The method according to claim 1, comprising, before inserting the box structure of the mounting structure into the top opening in the fuselage, assembling a top fairing with the middle portion of the box structure of the mounting structure so that the top fairing aerodynamically closes off a middle section of the top opening in the fuselage after the middle portion of the box structure has been fixed to the fuselage.

7. The method according to claim 6, wherein the top fairing is secured beforehand to a top aileron, the top aileron being positioned in such a way that, when the top fairing is assembled with the fuselage, the top aileron extends above the top fairing as a forward continuation of an empennage of the aircraft aft portion.

8. The method according to claim 1, comprising, after fixing the middle portion of the box section to the fuselage, mounting a top fairing on the fuselage, over a top of the middle portion of the box structure of the mounting structure, so that the top fairing aerodynamically closes off a middle section of the top opening in the fuselage.

9. The method according to claim 8, comprising mounting a top aileron on the top fairing as a forward continuation of an empennage of the aircraft aft portion.

10. The method according to claim 8, wherein the top fairing incorporates longitudinal stiffeners so that, during normal operation, the top fairing participates in the transfer of load between a portion of the fuselage that is situated aft of the top opening in the fuselage and a portion of the fuselage that is situated forward of the top opening in the fuselage.

11. The method according to claim 1, wherein the middle portion of the box structure of the mounting structure comprises an aerodynamic top skin delimiting the box structure, which is shaped to extend as a continuation of the outer skin of the fuselage after the middle portion of the box structure is inserted into the top opening in the fuselage.

12. The method according to claim 1, comprising moving the mounting structure in a vertical direction, resulting in the box structure of the mounting structure being inserted in the top opening in the fuselage.

13. The method according to claim 1, comprising fixing aircraft engines to the mounting structure before the box structure of the mounting structure is inserted into the top opening in the fuselage.

14. An aircraft aft portion comprising a fuselage, which comprises a fuselage outer skin, circumferential frames, and a top opening extending from one side to another of the fuselage across a vertical midplane thereof, such that the top opening opens towards a top and sides of the fuselage; and a mounting structure comprising a box structure and attachment structure configured to attach aircraft engines to the mounting structure, wherein the box structure comprises a middle portion housed in the top opening in the fuselage and fixed to the fuselage.

15. The aircraft aft portion according to claim 14, wherein the box structure comprises a top skin forming part of an outer fairing of the aircraft aft portion.

16. A method for assembling an aircraft aft portion, the method comprising:
assembling a fuselage outer skin and circumferential frames to form a fuselage of the aircraft aft portion, the fuselage having a top opening, which extends across a continuous portion of outer top surface of the fuselage, from one side of the fuselage to another side thereof across a vertical midplane of the fuselage, so that the top opening opens towards a top and towards sides of the fuselage;
assembling a box structure of a mounting structure provided with an attachment structure configured to attach aircraft engines to the mounting structure;
inserting a middle portion of the box structure of the mounting structure into the top opening of the fuselage; and
fixing the middle portion of the box structure to the fuselage.

* * * * *